United States Patent [19]
LaFollette

[11] Patent Number: 5,976,594
[45] Date of Patent: Nov. 2, 1999

[54] SYSTEM AND PROCESS FOR PRODUCING FEED FROM FOOD WASTE

[76] Inventor: John LaFollette, Rt. 3, Box 352-PL, Altha, Fla. 32421

[21] Appl. No.: 09/031,299

[22] Filed: Feb. 26, 1998

[51] Int. Cl.[6] .............................. A21D 8/00; A23L 1/18; B02C 11/08
[52] U.S. Cl. ..................... 426/285; 426/454; 426/518; 426/519; 426/635; 99/503; 241/39; 241/98
[58] Field of Search .................. 426/635, 454, 426/805, 453, 519, 518, 285; 34/346, 580; 99/503; 514/57, 39, 92, 98

[56] References Cited

U.S. PATENT DOCUMENTS

| | | | |
|---|---|---|---|
| 1,354,068 | 9/1920 | Taylor | 426/635 |
| 2,617,728 | 4/1952 | Van Atta | 426/635 |
| 3,615,727 | 10/1971 | Starke | 99/225 |
| 5,161,315 | 11/1992 | Long | 34/57 |
| 5,316,128 | 5/1994 | Long | 198/530 |
| 5,340,036 | 8/1994 | Riley | 241/56 |
| 5,346,714 | 9/1994 | Peters | 426/465 |
| 5,390,729 | 2/1995 | Long | 34/580 |
| 5,567,450 | 10/1996 | Zuromski et al. | 426/5 |
| 5,596,815 | 1/1997 | Rice et al. | 34/346 |
| 5,702,746 | 12/1997 | Wiik | 426/518 |

OTHER PUBLICATIONS

Transport Processes and Unit Operations 3rd Ed. Christie J. Geankoph's (p. 141).

*Primary Examiner*—David Lacey
*Assistant Examiner*—Hoa Mai
*Attorney, Agent, or Firm*—Norman E. Lehrer

[57] ABSTRACT

A continuous process for turning food waste into nutritionally balanced animal feed. A production system is disclosed which includes a series of pipes and tanks through which food waste is processed and dehydrated so that the food waste is ultimately converted into nutritionally balanced animal feed. The system includes, inter alia, a blending tank in which ground food waste is agitated, suspended, and drawn off with a food pump. The food waste is then metered to a precise level so that it may be blended with a precise amount of dry feed stock. Excess food waste is returned to the blending tank to be recirculated. The food waste mixed with the dry feed stock is then converted into moist pellets which are then dried and packaged to be distributed.

11 Claims, 2 Drawing Sheets

SYSTEM AND PROCESS FOR PRODUCING FEED FROM FOOD WASTE

BACKGROUND OF THE INVENTION

The present invention is directed toward a production system for animal feed and more particularly, toward a continuous process for turning food waste into dried, nutritionally balanced animal feed.

Food waste obtained from restaurants, institutional facilities, schools, military bases, and fish and poultry processing is commonly used to make dried animal feed because it contains a high level of nutrients. There are many techniques and procedures well known in the art by which dried animal feed is produced from food waste. However, a problem associated with processing food waste into animal feed is that inconsistent product results when typical batch processing is used. That is, batch processing involves smaller amounts of food waste being processed at any given time. This does not allow for the mixing of the food waste into a uniform mixture. As a result, an analysis of the final product formed on one day may differ significantly from a product formed on a different day or even product formed in a different batch on the same day.

Another problem associated with processing food waste into animal feed is that this waste typically has a high moisture and water content. In order to rid the waste of moisture, it is often mixed with a solid material. Various drying techniques and apparatus may also be used in order to reduce the moisture level of the waste.

One type of drying apparatus is a spray dryer. The material to be dried is sprayed into a confined space through which heated air is caused to flow and effect vaporization of moisture form the material. A dry solid results. This technique, however, requires a large amount of heat and mechanical energy.

Another drying technique uses a fluidized bed dryer. A fluidized bed dryer includes a bedplate with holes. The material to be dried is placed on the bedplate. Heated air flows upwardly through the holes at desired volume and velocity levels in order to vaporize the moisture. This technique, however, does not work well with all materials. That is, because these solids have a high moisture content, they tend to agglomerate into large masses. As a result, the heated air has difficulty penetrating these masses, the agglomerated material retains moisture, and only the outside of the mass gets dried.

U.S. Pat. No. 5,596,815 to Rice et al discloses a material drying process which removes moisture from a solid's base material by forming the material into compacted pellets and then passing heated air around the pellets to effect removal of moisture by vaporization of the same. The problem with this technique is that as the moisture level is reduced, the beneficial water content of the pellet may also be reduced. Therefore, valuable nutrients may be lost.

SUMMARY OF THE INVENTION

The present invention is designed to overcome the deficiencies of the prior art described above and to provide a continuous process for turning food waste into nutritionally balanced animal feed.

It is a further object of the invention to provide a system which mixes wet food waste with dry feed stock in controlled amounts so that the resulting animal feed contains a balanced level of nutrients.

In accordance with the illustrative embodiments, demonstrating features and advantages of the present invention, there is provided a production system which includes a series of pipes and tanks through which food waste is processed and dehydrated so that the food waste is ultimately converted into nutritionally balanced animal feed. The system includes, inter alia, a blending tank in which ground food waste is agitated, suspended, and drawn off with a food pump. The food waste is then metered to a precise level so that it may be blended with a precise amount of dry feed stock. Excess food waste is returned to the blending tank to be recirculated. The food waste mixed with the dry feed stock is then converted into moist pellets which are then dried.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
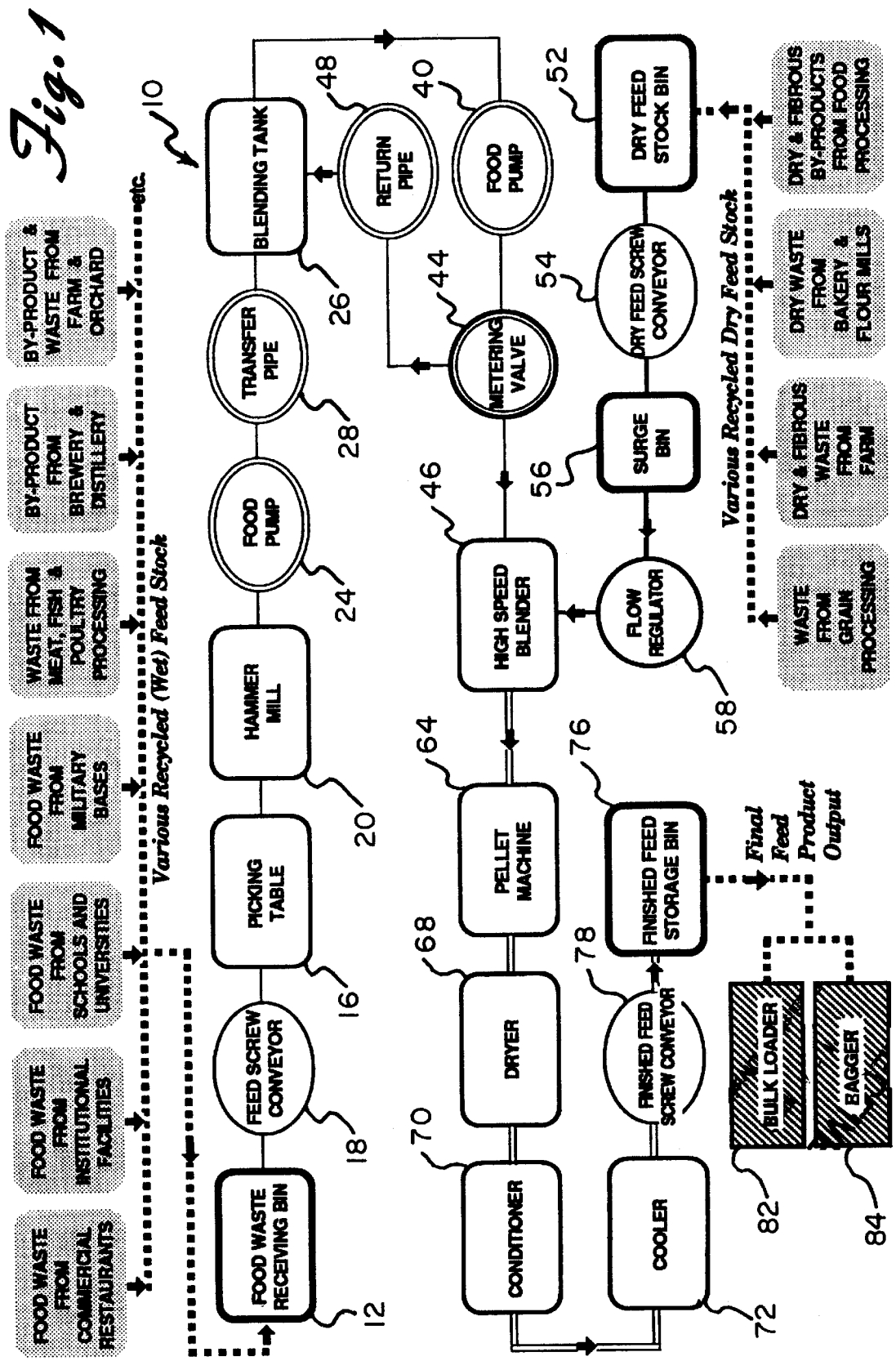
FIG. 1 is a diagrammatic representation of the present production system and FIG. 2 is a schematic representation of the present invention.
Figure 2:
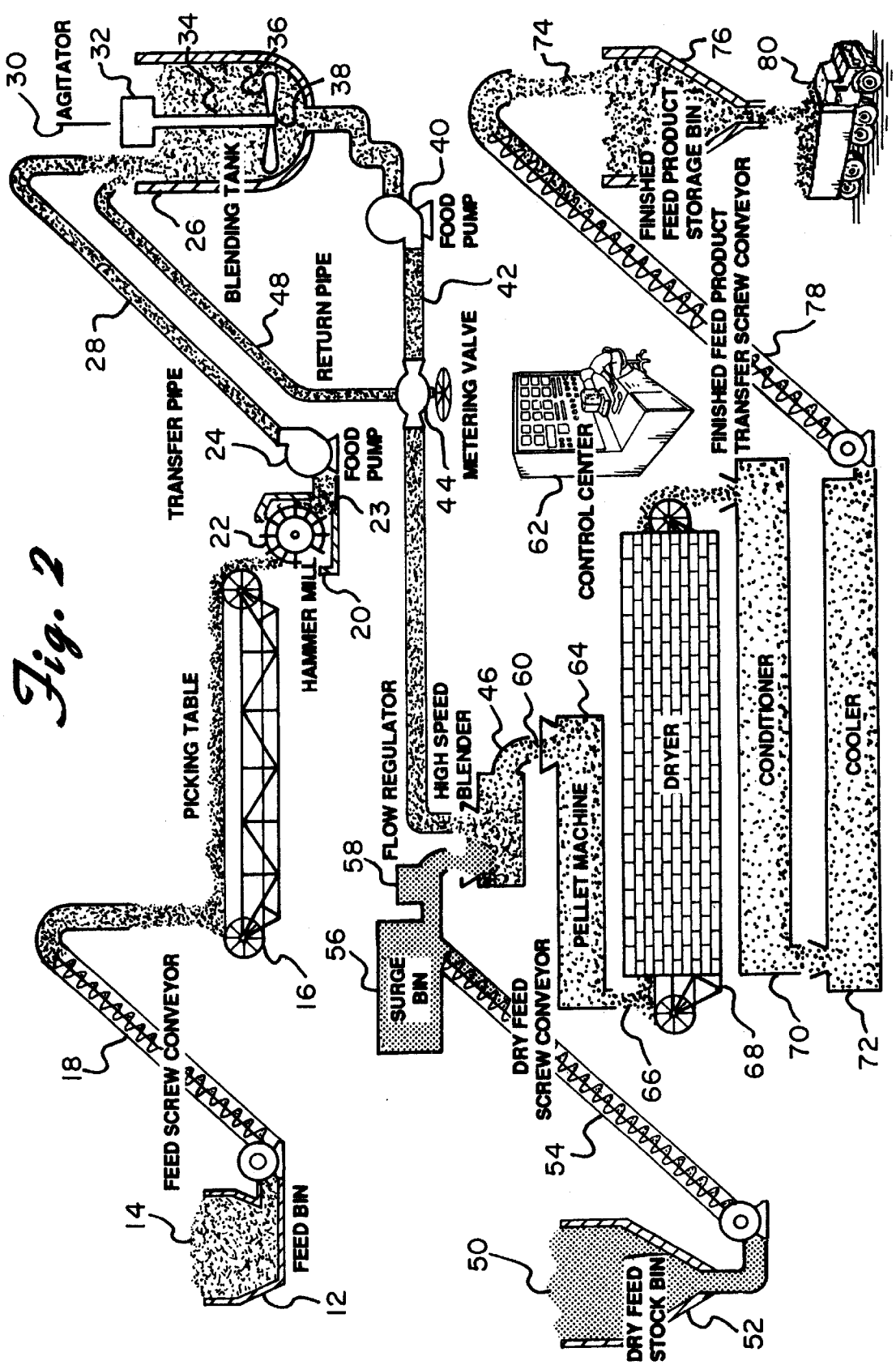

Referring now to the drawings in detail wherein like reference numerals have been used throughout the various figures to designate like elements, there is shown in FIG. 1 a production system constructed in accordance with the principles of the present invention and designated generally as 10.

The starting point of the system is feed bin 12 which is generally a large holding tank into which wet food waste 14 is deposited. The food waste 14 may be collected, for example, from restaurants, institutional facilities, schools, military bases, fish and poultry processing, and breweries. The wet food waste 14 is moved from the feed bin 12 to a picking table 16 via a feed screw conveyor 18. People stand on both sides of the picking table 16 and remove any non-food material from the food waste 14. The food waste 14 is then dropped into a hammer mill 20 which consists of a series of hammers 22 and a metal screen with holes (not shown). The hammers 22 spin around, beat the food waste 14, and knock the food waste through the holes of the metal screen. This hammer mill is similar to a typical hammer mill used to grind corn or other grain-type products except that the screen has holes which are extremely small. For example, the holes may each have a diameter that is approximately 3/16 of an inch. The hammer mill 20 grinds the food waste to a very fine consistency but retains the water content.

The wet, ground food waste 23 is then fed into a food pump 24. The pump 24 moves the wet, ground food waste 23 from the hammer mill 20 into a blending tank 26 via a transfer pipe 28. This transfer pipe 28 may be plastic and may have a diameter of approximately four inches. The blending tank 26 is where all incoming product is continuously mixed to produce an even mixture. The tank 26 is sufficiently large in order to ensure that the product is properly mixed. An agitator 30 is contained within the blending tank 26 and mixes the incoming product. The agitator 30 may be a motor 32 with an elongated shaft 34 and a propeller 36 extending from an end 38 of the shaft 34. The agitator 30 keeps the wet, ground food waste 23 suspended within the tank 26.

The wet, ground food waste 23 is then drawn off through the use of a food pump 40. The wet, ground food waste 23 is then passed through a pipe 42 containing a metering valve 44. The valve 44 is under approximately forty pounds of pressure and is adjustable so that the amount of wet, ground food waste 23 passing through the pipe 42 and into a high speed blender 46 may be controlled. Any excess food waste 23 is moved into a return pipe 48 which feeds the wet, ground food waste 23 back into the blending tank 26 to be recirculated. This recirculation, of course, helps to maintain the even consistency of the product.

At an opposite end of the system, dry feed stock 50 is unloaded from trucks and is stored in a dry feed stock bin 52. Any type of dry and fibrous product from farm waste or food processing typically used in the art may be deposited in this bin. For example, rice hulls, soy hulls, corn, or grain sorgum may be used. The dry feed 50 is conveyed via screw conveyor 54 to a surge bin 56. The bin 56 holds approximately one hundred pounds of dry feed. A flow regulator 58 precisely meters the dry feed 50 to be fed into the high speed blender 46 where the dry feed 50 mixes with the wet, ground food waste 23. The dry feed stock 50 and wet, ground food waste 23 are blended within the high speed blender 46 in a controlled ratio through the use of the metering valve 44 and flow regulator 58. The resulting mixture 60 has approximately a 40% moisture content. The metering valve 44 and flow regulator 58 are monitored and adjusted at the control center 62 so that a precise ratio of wet, ground food waste to dry feed is maintained. It should be noted, however, that other aspects of the system may also be monitored at the control center 62.

The mixture 60 is then deposited into a pellet machine 64 which converts the mixture 60 into moist pellets 66 by pressure forming. This process is per se well known in the art. (See, for example, U.S. Pat. No. 5,596,815.) The pellets 66 are then passed into a dryer 68 which dehydrates the pellets 66 by dry heat aeration over a fluidized bed to yield hot, dry pellets. The dryer 68 has a recording thermometer (not shown) affixed thereon. This device records the temperature of the pellets to assure that government standards regarding temperature and retention time are being maintained. The dried pellets are then sent into a conditioner 70 which holds the pellets at a desired temperature for a period of time. For example, the pellets may be moved back and forth on a conveyor for approximately 1 to 30 minutes. The pellets are then conveyed to a cooler 72. The cooler 72 cools the pellets to room temperature, yielding finished feed product or pellets 74. The product 74 is then conveyed to a feed product storage bin 76 via transfer screw conveyor 78 from which the pellets 74 are loaded onto a truck 80, a bulk loader 82, or into a bagger 84 for distribution.

The present invention achieves optimum product efficiency because it is a continuous process as opposed to prior art batch processes. The present process also yields nutritionally well balanced animal feed by allowing for reasonably flexible control of the quantity of food waste and dry feed stock that are mixed together. Furthermore, mixing wet food waste with dry feed stock not only provides for balanced levels of nutrients, it also allows for substantial moisture reduction without disposing of water soluble nutrients of the food waste.

The present invention may be embodied in other specific forms without departing from the spirit and essential attributes thereof and accordingly, reference should be made to the appended claims rather than to the foregoing specification as indicating the scope of the invention.

I claim:

1. A process of producing animal feed from food waste comprising the steps of:

depositing food waste into a feed bin;

conveying the food waste to a picking table where non-food waste material is removed from the food waste;

grinding the food waste into wet, ground food waste;

agitating the ground food waste in a blending tank so that the food waste is suspended;

metering out an amount of the ground food waste which is to be added to dry feed stock;

returning a portion of the metered out ground food waste back to the blending tank;

adding dry feed stock to the ground food waste using a flow regulating means for regulating the amount of dry feed stock added to the ground food waste;

blending the metered, ground food waste with the dry feed stock into a mixture; and forming the mixture into pellets.

2. The process of producing animal feed from food waste claimed in claim 1 further including the step of drying the pellets.

3. The process of producing animal feed from food waste claimed in claim 2 further including the step of holding the pellets at a certain temperature.

4. The process of producing animal feed from food waste claimed in claim 3 further including the step of cooling the pellets.

5. The process of producing animal feed from food waste claimed in claim 1 wherein said grinding step includes using a hammer mill to grind the food waste.

6. The process of producing animal feed from food waste claimed in claim 1 wherein the agitating step includes using a motor having an elongated shaft with a propeller at an end thereof.

7. The process of producing animal feed from food waste claimed in claim 1 wherein said metering step includes using an valve which is adjustable.

8. A system for producing animal feed from food waste comprising:

a feed bin into which food waste is deposited;

a conveyor and a picking table, said conveyor conveying the food waste from said bin to said picking table where non-food waste material is removed from the food waste;

grinding means for grinding the food waste from the picking table into wet, ground food waste;

a blending tank with an agitator in which the ground food waste is blended so that the ground food waste is suspended;

a surge bin where dry feed stock is stored;

flow regulating means connected to the surge bin for regulating the amount of dry feed stock to be removed from the surge bin and added to the ground food waste;

metering means connected to the blending tank for controlling the amount of ground food waste which is to be added to the dry feed stock;

a return pipe connected to the metering means which returns a portion of the ground food waste to the blending tank;

a blender into which the metered food waste and the regulated amount of dry feed stock are fed and blended into a mixture; and a pellet machine into which the mixture is deposited and is formed into pellets.

9. The system for producing animal feed from food waste as claimed in claim 8 wherein said agitator is a motor having an elongated shaft with a propeller at an end thereof.

10. The system for producing animal feed from food waste as claimed in claim 8 wherein said metering means is a valve.

11. The system for producing animal feed from food waste as claimed in claim 8 further including drying means for drying the pellets.

* * * * *